United States Patent [19]

Pettinato et al.

[11] 4,148,925

[45] Apr. 10, 1979

[54] PROCESS FOR HOT SMOKING FISH

[75] Inventors: F. Edward Pettinato, Bronx; Maynard A. Herman, Amawalk; Steven Koczak, Woodhaven, all of N.Y.

[73] Assignee: Brown & Williamson Tobacco Corp., Louisville, Ky.

[21] Appl. No.: 832,610

[22] Filed: Sep. 12, 1977

[51] Int. Cl.² ............................................. A22C 25/00
[52] U.S. Cl. .................................... 426/235; 426/523
[58] Field of Search ...................... 426/235, 523, 643

[56] References Cited
U.S. PATENT DOCUMENTS

| | | | |
|---|---|---|---|
| 1,960,516 | 5/1934 | Taylor | 426/235 |
| 2,832,278 | 4/1958 | Taranik | 426/235 |

OTHER PUBLICATIONS

Marine Products of Commerce, 2nd Ed., Reinhold Publishing Corp., N.Y., 1951, pp. 394-405 & 412-417.

*Primary Examiner*—Raymond N. Jones
*Assistant Examiner*—Elizabeth A. Hatcher
*Attorney, Agent, or Firm*—William J. Mason; Charles G. Lamb

[57] ABSTRACT

The disclosure is of a process for hot smoking fish to high cooking temperature without significant degradation of the fish product. The process comprises converting the fish skin to a moisture impervious state under non-cooking conditions and then cooking the fish in the presence of smoke while maintaining the moisture impervious nature of the fish skin. Cooking is carried out by raising the ambient temperature incrementally at a specific rate. The fish is subjected to ambient cooking temperatures higher than generally used in prior art processes, enabling one to achieve internal fish temperatures of circa 140° F.–160° F. and higher.

11 Claims, 1 Drawing Figure

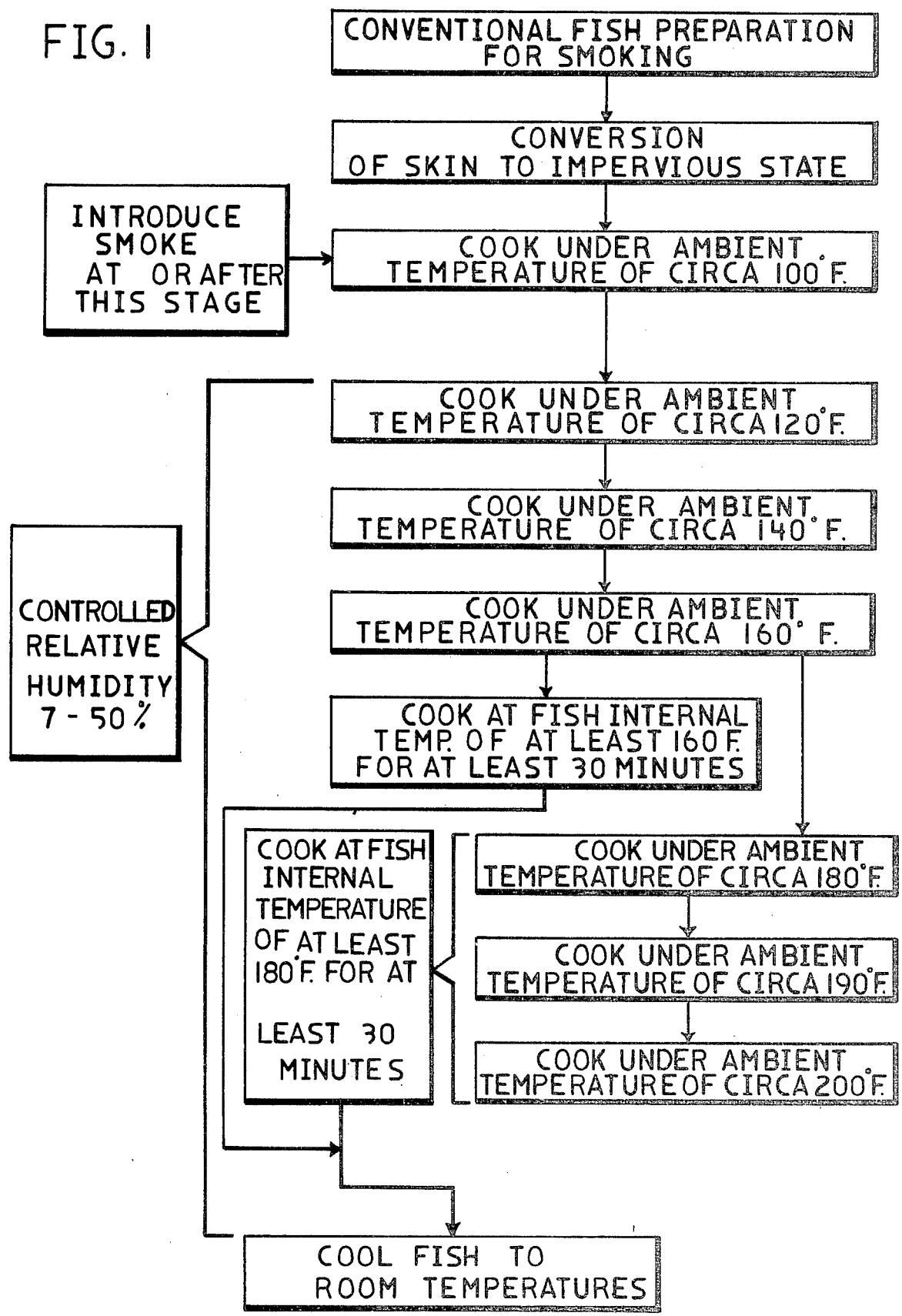

PROCESS FOR HOT SMOKING FISH

BACKGROUND OF THE INVENTION

1. Field of the Invention

The invention relates to the smoking of comestibles and more particularly relates to the hot smoking of fish.

2. Brief Description of the Prior Art

Smoking as a means of curing and treating fish for consumption is an ancient art. A review of the art may be found in chapter 4 of the text "Fish Handling and Processing" published by Noyes Data Corporation, Park Ridge, New Jersey.

In general, fish smoking processes fall into two broad classifications. The first is termed "cold smoking" and is carried out by exposing the prepared fish to smoke at temperatures below cooking temperatures (circa 85° F.). In the second class, termed "hot smoking" the intention is to cook the fish in addition to imparting the distinctive smokey flavor. Prior to our invention hot smoking was generally carried out under cooking conditions whereby the center of the fish body may have reached a maximum of 140° F. Higher temperatures were generally avoided because experience had shown that if the internal temperature of the fish exceeded about 140° F. for any appreciable period of time, the fish body acquired a mushy texture, developed aesthetically unacceptable body splits, scorched and lost muscle and skin strength so the fish by virtue of its own weight would tear loose from the skewer sticks. The fish would then fall to the floor of the smoke chamber, becoming what is referred to in the art as a "dropper". Droppers represent an economic loss and wastage since the dropper is difficult to package (being "squashy") and is unappealing to the eye of the potential customer since the dropper generally lacks the glossy surface appearance associated with a properly smoked fish.

It would be desirable to process fish according to the "hot smoke" procedure, but at cooking temperatures sufficient to reach temperatures of from 160° F. to 180° F. and higher within the fish body for prolonged periods of time. At those temperatures there would be an assurance of destroying bacterial spores such as those of *Clostridium botulinum* type E. By the process of our invention, these higher internal fish body temperatures may be achieved without a substantial increase in the number of droppers resulting from the exposure of the fish to these high temperatures. The fish product obtained by the process of the invention may be characterized by a highly desirable and appealing gloss, color and texture. The fish product is tender, moist and appetizing.

In addition, the prior art processes generally result in a fish weight loss of about 30 percent. Unexpectedly, such weight losses are generally less than about 20 percent when smoking is carried out by the process of our invention. This is of course an economic advantage.

SUMMARY OF THE INVENTION

The invention comprises a method of hot smoking fish, which comprises;

(a) providing said fish in a condition suitable for hot smoking;

(b) converting the skin of the provided fish to a moisture impervious state;

(c) cooking the fish while maintaining the impervious state of the skin, said cooking being carried out by (i) raising the ambient temperature in several increments, until the center of the fish body reaches a temperature of 160° F. the rate of raising said temperature being such that the ambient temperature does not exceed the temperature at the center of the fish by more than about 50° F.; and (ii) optionally raising the ambient temperature in several increments until the center of the fish body reaches a temperature of 180° F., the rate of raising the ambient temperature being such that the ambient temperature does not exceed the temperature at the center of the fish by more than about 30° F. after the temperature at the center of the fish exceeds about 160° F.;

(d) maintaining the temperature at the center of the fish at from 160° F. to about 180° F. for a period of time sufficient to destroy bacterial spores; and (e) smoking the cooking fish until the desired color of the fish is obtained.

The process of the invention is particularly advantageous for the smoking of fresh water fish such as chubs, whitefish and the like.

BRIEF DESCRIPTION OF THE DRAWINGS

The drawing is a schematic flow plan for a preferred process of the invention.

DETAILED DESCRIPTION OF THE INVENTION

The fish to be smoked and cooked by the process of the invention are generally obtained either freshly iced or completely frozen. The raw fish are organoleptically examined (by smell) for decomposition and, if iced, stored in refrigerators until cooking is to begin. If frozen, the fish are stored in refrigerators until the time for their cooking. Frozen fish are then thawed in water overflow tanks. Iced fish are rinsed with cold water. Conventionally, after dethawing or rinsing, the raw fish are spooned (gutted), scaled and transferred to a tank containing a brine solution. The raw fish are soaked in the brine solution for a period ranging from several hours to overnight. Depending on the type of fish, they may then be soaked in a second brine solution for an additional similar period of time.

At the conclusion of brining, a hose is placed in the brining tank to rinse the raw fish with cold water. At the conclusion of this rinse the fish are generally transferred to a hanging tank. The hanging tank is filled with enough water to keep the fish covered during the hanging operation. Smoke sticks are placed across the hanging tank supports and the fish are hung on the sticks by hand. As each stick is hung it is transferred to a rack for smoking.

The above steps constitute a conventional preparation of fish bodies for smoking and may be varied as desired with additional rinsings, cleanings and the like. In a preferred embodiment process of the invention, the fish are also sized and hung on the sticks with fish of a similar size for a given production run. In sizing the fish, they are arranged in lots wherein the individual fish vary in weight from each other by no more than about ±1 lb. and the lots are segregated for individual hot smoking in a single smoking oven. The sizing of fish provides a means of more uniformly cooking all of the fish.

Having provided the fish in a condition and state of readiness for smoking, the process of the invention is continued by next converting the skin of the fish to a moisture impervious state. The dermis of most edible fish lacks a stratum corneum and keratinized cells associated with such a layer which would impede or prevent moisture flow through the skin. The epidermis of fish skin instead contains many unicellular glands for mucous secretions to lubricate the skin. To convert the fish skin to a moisture impervious state, the skin may be dried in-situ with a consequent hardening of mucous and removal of moisture in the epidermis and dermis. There is generally a shrinkage of the skin with a resultant resistance to the passage of moisture. During the brining of the fish, protein at cut surfaces dissolves to give a sticky coating. This coating, upon drying of the fish skin, also hardens to form a moisture impermeable coating over the cut sites. The skin, dried under non-cooking conditions forms a crust of set protein which is essential to the desired results obtained by the method of the invention. Generally one can determine when the desired state of moisture impermeability is obtained by touching the skin with a bare hand or finger. When the skin is dry to the touch, the skin has been converted to a sufficient degree of moisture impermeability to proceed with cooking the fish. Drying of the fish skin can be carried out by hanging the fish under drying conditions. Forced circulation of air around the fish will accellerate drying which generally occurs in from one-half to one and one-half hours depending on the drying conditions.

Having converted the skin of the fish to be smoked and cooked to an impervious state, the next step in the process of the invention is to cook the fish, while maintaining the moisture impervious state of the fish skin. The impervious state of the fish skin may be maintained by carefully controlling the humidity within the cooking kiln. The relative humidity within the smoking kiln should be maintained low enough to obviate the possibility of the fish skin absorbing enough moisture to reconvert to a moisture permeable state. In general, the humidity within the cooking kilns should be maintained within the range of from about 7 to about 50 percent (relative humidity). Lower relative humidity during cooking in the kiln will generally result in a splitting or other destruction of the fish skin with loss of moisture from the fish body. Higher relative humidities may reconvert the fish skin to a moisture permeable state which can then result in an unsatisfactory product (splitting, charring, poor texture, etc.). If the skin reconverts to a moisture permeable state, release of moisture from the fish body can also undesirably cool the fish body through the evaporative process.

In accordance with the method of the invention, cooking of the fish may be carried out by raising the ambient temperature (the temperature within the smoking kiln within which cooking is being carried out) in several increments, at a controlled rate so that the difference between the ambient oven temperature and the internal temperature of the fish body does not have a differential of more than about 50° F. until the center of the fish body reaches a temperature of about 160° F. If the desired internal temperature of the fish body is as high as about 180° F., the differential between ambient temperature and the temperature of the center of the fish should not be greater than about 30° F. in the incremental raising of the temperature so as to bring the internal fish temperature from 160° F. up to about 180° F. Once the desired temperature has been achieved, it may be maintained for a period of time sufficient to destroy bacterial spores.

It has been our experience that if the ambient temperature is raised at a greater rate than specified above, a high percentage of "droppers" occurs with an unsatisfactory product. Of course higher than specified temperatures can be tolerated for a few minutes but should be avoided if at all possible.

Smoke may be introduced at any time during the cooking process, and continued for a time sufficient to develop the desired light golden color. In general, smoke is introduced at the beginning of the cooking step.

Referring now to FIG. 1, a preferred embodiment process of the invention will be described. After conversion of the fish skin to an impervious state as described above, the fish is placed in a conventional smoking kiln fitted with temperature sensing and recording means and with a means for determining the humidity within the kiln. The ambient temperature within the kiln is adjusted to a temperature of circa 100° F. Preferably, the temperature is maintained up to about 110° F. until the temperature at the center of the fish as determined by a pyrometer probe inserted in the fish body shows that the temperature at the center of the fish is within the range of from about 85° F. to 105° F. When these internal fish temperatures have been reached, the ambient temperature within the smoking kiln may then be adjusted upwards to a temperature of circa 120° F. Preferably, the temperature is adjusted upward to be within the range of from about 110° F. to 130° F. until the temperature at the center of the fish is determined to be within the range of from about 100° F. to 125° F. In these initial cooking steps, control of the relative humidity within the smoking kiln is not critical, but preferably will be maintained within the range of from 7 to about 50% relative humidity. Those skilled in the art of using smoking kilns will appreciate and understand how to control the relative humidity within the ovens or kilns. In general, moisture may be added with water sprays and the relative humidity may be decreased by opening the kiln dampers periodically. Maintaining the aforementioned humidity within the smoking kilns during the following cooking steps is more critical to a satisfactory result than at any previous stage.

When the internal temperature of the fish has been determined to be within the range of from about 100° F. to about 125° F., preferably close to 120° F., the ambient temperature within the smoking kiln may then be raised to a temperature within the range of from about 130° F. to about 150° F., preferably circa 140° F. for a period of time sufficient to raise the temperature at the center of the fish body to from about 125° F. to about 145° F. During this cooking step, it is preferable to maintain the relative humidity within the smoking kiln within the range of from about 14 to about 50% relative humidity. When the desired internal temperature of the fish has been achieved, the ambient temperature within the smoking kiln is again adjusted upward to within the range of from about 150° F. to 170° F. until the temperature of the center of the fish body reaches a temperature within the range of from about 145° F. to about 165° F. Preferably the internal fish body temperature achieved at this stage will be at least 160° F. During this cooking step, the relative humidity within the cooking kiln is preferably maintained within the range of from about 23% to about 50%. When the temperature at the center of the fish body reaches from about 145° F. to about 165° F. the ambient temperature of the smoking kiln may then be adjusted upwards to within the range of from about 170° F. to 200° F. and maintained at this level under an ambient humidity of about 7 to 40 percent until the desired degree of cooking has been obtained. In general, the desired degree of cooking is obtained when the center of the fish body is maintained at a temperature of from 160° F. to about 180° F. for a period of at least 30 minutes. At the end of the cooking period, the fish is allowed to cool to room temperatures whereupon they may be further processed for marketing by cooling, packaging, etc.

Smoking of the fish may be carried out at any time during the cooking procedure. Generally, smoke is introduced at the initial cooking step and continued until the desired color (golden yellow) is achieved.

It will be appreciated by those skilled in the art that optimal process conditions will vary slightly depending upon the size of the fish, species of fish, fat and moisture contents of the fish and like variables. Those skilled in the art may readily determine optimum process conditions within the above described invention by trial and error.

It will be observed from the above description that the ambient cooking temperatures are adjusted incrementally in several stages until the desired temperature is achieved at the center of the fish body to be cooked. In general, each step is carried out within a time period of from about 30 to about 45 minutes. This of course may vary depending upon the size of the fish. When dealing with larger fish, i.e.; on the order of whitefish which range from about 3 lbs. and upward, it is preferred that additional incremental cooking steps be employed. This is particularly so if very high internal temperatures, i.e.; on the order of circa 180° F. are to be obtained. In these circumstances, when the internal temperature of the fish body has achieved a temperature of about 125° F. to about 145° F. it is preferred that the ambient temperature be increased in incremental steps of about 10° F., each incremental raising occurring as the temperature of the fish body at its center approaches within about 5° F. of the ambient temperature. During these 10° incremental steps of cooking (each step may take from 30 to 45 minutes) it is advantageous to maintain the relative humidity within the smoking kiln within the range of from about 7 to about 35% relative humidity. More specifically, the ambient temperature for these larger fish is preferably raised after the internal fish body temperature has reached 100° F. to 125° F., first to about 140° F. with a relative humidity of from 26 to 35%. In subsequent increments, the ambient temperature may be raised to circa 160° F. while maintaining a relative humidity of from 16 to 22% and then to 180° F. ambient temperature while maintaining a relative humidity of from 11 to 14%. In the next step, the ambient temperature may be raised to circa 190° F. while preferably maintaining a relative humidity of from 9 to 12% and then the ambient oven temperature may be raised to circa 200° F. while maintaining a relative humidity of from about 7 to 9% until the desired degree of cooking has been achieved. Of course the desired degree of cooking may be achieved before the ambient temperature reaches 200° F.

It should be appreciated that at all times while carrying out the process of the invention good manufacturing procedures (sanitation) should be followed.

The following examples describe the manner and process of making and using the invention and set forth the best mode contemplated by the inventor of carrying out the invention, but are not to be construed as limiting.

EXAMPLE 1

A lot of fresh, iced chubs is eviscerated, washed and brined following conventional procedure. The chubs are hung on sticks. The fish average slightly less than a pound each and the gross weight of the lot is 480 lbs. (upon hanging). The hung fish are stood for about one and one-half hours at room temperature (circa 76°-78° F.) with air circulated by a blower. At the end of this period it is noted that the skins of the hung fish are dry to the touch. The dried skin lot is then placed in an Alkar-Rasmuson meat oven (alkar-Rasmuson Co., Lodi, Wisconsin) fitted with ambient temperature and wet bulb temperature recording means. Fish in representative positions within the oven are fitted with pyrometer probes to measure the temperature at the center of the fish bodies. The ambient temperature within the oven is raised in increments, while controlling the relative humidity within the oven by adding moisture or opening the oven dampers as needed to maintain the relative humidity. Smoke is introduced into the oven. After about 3¾ hours of cooking the fish are allowed to cool to room temperature. The smoked and cooked fish weigh 397 lbs. (a loss of about 17 percent), have a soft golden color, are moist, tender and highly marketable. The droppers are negligible. The ambient oven temperatures, wet bulb temperature in the oven and the temperature at the center of the fish during the cooking period are given in Table 1, below.

TABLE 1

| Cooking Time (Minutes) | Ambient Temp. (°F.) | Wet Bulb Temp. (°F.) | Fish Internal Temp. (°F.) |
|---|---|---|---|
| 0 | 78 | 68 | 68 |
| 7.5 | 100 | 82 | 68 |
| 15 | 100 | 82 | 72 |
| 22.5 | 102 | 83 | 78 |
| 30 | 102 | 83 | 82 |
| 37.5 | 103 | 83 | 84 |
| 45 | 103 | 82 | 85 |
| 52.5 | 122 | 96 | 86 |
| 60 | 124 | 93 | 88 |
| 67.5 | 124 | 90 | 94 |
| 75 | 122 | 90 | 98 |
| 82.5 | 140 | 114 | 100 |
| 90 | 144 | 104 | 100 |
| 97.5 | 140 | 104 | 108 |
| 105 | 160 | 104 | 113 |
| 112.5 | 162 | 126 | 116 |
| 120 | 160 | 112–120 | 118 |
| 127.5 | 160 | 112–120 | 125 |
| 135 | 162 | 112–120 | 129 |
| 142.5 | 180 | 132–140 | 131 |
| 150 | 170 | 132–140 | 132 |
| 157.5 | 186 | 132–140 | 137 |
| 165 | 186 | 132–140 | 143 |
| 172.5 | 185 | 132–140 | 144 |
| 180 | 184 | 132–140 | 147 |
| 187.5 | 184 | 132–140 | 150 |
| 195 | 188–190 | 132–140 | 152 |
| 202.5 | 188–190 | 132–140 | 153 |
| 210 | 188–190 | 132–140 | 155 |
| 217.5 | 188–190 | 132–140 | 157 |
| 225 | 188–190 | 132–140 | 160 |
| 232.5 | 188–190 | 132–140 | 161 |
| 240 | 188–190 | 132–140 | 162 |

EXAMPLE 2

The general procedure of Example 1, supra., was followed again using a new lot of chubs which were air dried for 1 hour until the fish skin was dry to the touch.

The dried and smoked chubs obtained are golden yellow in color tasty and highly marketable. The number of droppers is negligible. The ambient oven temperatures, wet bulb temperature in the oven and the temperature at the center of the fish during the cooking period are given in Table 2, below.

TABLE 2

| Cooking Time (Minutes) | Ambient Temp. (°F.) | Wet Bulb Temp. (°F.) | Fish Internal Temp. (°F.) |
|---|---|---|---|
| 0 | 88 | — | 72 |
| 7.5 | 94 | 78 | 74 |
| 15 | 96 | 80 | 76 |
| 22.5 | 97 | 80 | 80 |
| 30 | 98 | 82 | 82 |
| 37.5 | 98 | 82 | 84 |
| 45 | 98 | 82 | 85 |
| 52.5 | 100 | 82 | 87 |
| 60 | 100 | 120 | 87 |
| 67.5 | 100 | 100–110 | 87 |
| 75 | 100 | 100–110 | 96 |
| 82.5 | 116 | 100–110 | 102 |
| 90 | 120 | 100–110 | 106 |
| 97.5 | 122 | 112–122 | 109 |
| 105 | 124 | 112–122 | 111 |
| 112.5 | 126 | 112–122 | 114 |
| 120 | 126 | 116–124 | 122 |
| 127.5 | 146 | 116–124 | 125 |
| 135 | 138–142 | 116–124 | 126 |
| 142.5 | 138–142 | 116–124 | 129 |
| 150 | 138–142 | 116–124 | 131 |
| 157.5 | 168 | 116–124 | 137 |
| 165 | 158–164 | 116–124 | 138 |
| 172.5 | 158–164 | 116–124 | 140 |
| 180 | 158–164 | 116–124 | 142 |
| 187.5 | 158–164 | 96–98 | 152 |
| 195 | 186 | 96–98 | 152 |
| 202.5 | 178–184 | 96–98 | 158 |
| For 1 hr. 15 min. more | 178–184 | 96–98 | 160–168 |

EXAMPLE 3

A lot of chubs (Huron) were prepared and hung for smoking. The lot grossed 370.5 lbs. and had a salt content of 4.35 percent (loin muscle). The hung fish were stood for about 2 days at a temperature of 38° F. to dry the skin. At the end of this period the fish skins were dry to the touch. The fish were then cooked and smoked for a little over 3 hours following the general procedure of Example 1, supra to obtain a highly marketable product of excellent color (golden yellow) and taste. the yield was 347.0 lbs (5.7 percent loss). The final product had a salinity of 5.0 percent. The droppers are negligible. The ambient oven temperatures, wet bulb temperature in the oven and the temperature at the center of the fish during the cooking period are given in Table 3, below.

TABLE 3

| Cooking Time (Minutes) | Ambient Temp. (°F.) | Wet Bulb Temp. (°F.) | Fish Internal Temp. (°F.) |
|---|---|---|---|
| 0 | 84 | 73 | 78 |
| 7.5 | 85 | 74 | 78 |
| 15 | 86 | 74 | 78 |
| 22.5 | 88 | 74 | 78 |
| 30 | 90 | 80 | 78 |
| 37.5 | 100 | 83 | 81 |
| 45 | 104 | 82 | 88 |
| 52.5 | 106 | 88 | 90 |
| 60 | 110 | 100–120 | 95 |
| 67.5 | 140 | 100–120 | 107 |
| 75 | 142 | 100–120 | 124 |
| 82.5 | 140 | 100–120 | 127 |
| 90 | 140 | 100–120 | 134 |
| 97.5 | 162 | 100–120 | 141 |
| 105 | 160 | 120–130 | 142 |
| 112.5 | 160 | 120–130 | 147 |
| 120 | 180 | 120–130 | 151 |
| 127.5 | 182 | 120–130 | 153 |
| 135 | 178 | 120–130 | 153 |
| 142.5 | 180 | 120–130 | 153 |
| 150 | 180 | 120–130 | 155 |
| 157.5 | 180 | 120–130 | 155 |
| 165 | 180 | 120–130 | 155 |

EXAMPLE 4

The general procedure of Example 1, supra is repeated, but using Whitefish (Slaves) having an average weight of 3 lbs. The prepared for smoking fish were dried for about 45 minutes at 90°–92° F. to convert their skins to a moisture impermeable state. Cooking was carried on for about 5½ hours to obtain a smoked and cooked fish which is of a soft gold color and which are moist, tender and highly marketable. The droppers are negligible. The ambient oven temperatures, wet bulb temperature in the oven and the temperature at the center of the fish during the cooking period given in Table 4, below.

TABLE 4

| Cooking Time (Minutes) | Ambient Temp. (°F.) | Wet Bulb Temp. (°F.) | Fish Internal Temp. (°F.) |
|---|---|---|---|
| 0 | 92 | 70 | 72 |
| 7.5 | 104 | 70 | 75 |
| 15 | 107 | 74 | 75 |
| 22.5 | 109 | 75 | 78 |
| 30 | 110 | 75 | 80 |
| 37.5 | 111 | 76 | 84 |
| 45 | 112 | 76 | 86 |
| 52.5 | 118 | 76 | 88 |
| 60 | 120 | 104 | 90 |
| 67.5 | 118 | 88–98 | 94 |
| 75 | 120 | 88–98 | 97 |
| 82.5 | 120 | 88–98 | 100 |
| 90 | 120 | 88–98 | 103 |
| 97.5 | 140 | 88–96 | 105 |
| 105 | 141 | 100–110 | 106 |
| 112.5 | 140 | 100–110 | 109 |
| 120 | 140 | 100–110 | 112 |
| 127.5 | 160 | 100–110 | 116 |
| 135 | 162 | 118–130 | 119 |
| 142.5 | 162 | 118–128 | 122 |
| 150 | 164 | 118–128 | 124 |
| 157.5 | 162 | 118–128 | 126 |
| 165 | 164 | 118–128 | 130 |
| 172.5 | 182 | 118–128 | 134 |
| 180 | 180 | 130–140 | 138 |
| 187.5 | 180 | 130–140 | 141 |
| 195 | 180 | 130–140 | 144 |
| 202.5 | 182 | 130–140 | 146 |
| 210 | 180 | 130–140 | 149 |
| 217.5 | 196 | 130–140 | 153 |
| 225 | 192 | 140–150 | 158 |
| 232.5 | 190 | 140–150 | 160 |
| 240 | 194 | 140–150 | 162 |
| 247.5 | 190 | 140–150 | 164 |
| 255 | 195 | 140–150 | 167 |
| 262.5 | 195 | 140–150 | 170 |
| 270 | 195 | 140–150 | 173 |
| 277.5 | 200 | 140–150 | 175 |
| 285 | 195 | 140–150 | 177 |
| 300 | 195–200 | 140–150 | 179 |
| 307.5 | 195–200 | 140–150 | 180 |
| 315 | 195–200 | 140–150 | 181 |
| 322.5 | 195–200 | 140–150 | 182 |
| 330 | 195–200 | 140–150 | 182 |
| 337.5 | 195–200 | 140–150 | 182 |

EXAMPLE 5

A separate lot of Whitefish (slaves) were cooked and smoked following the general procedure of Example 4, supra., except that drying of the fish skins took 1 hour at a temperature of 80°-88° F. The oven temperature control was adjusted upward in temperature by 20° F. increments, starting from 100° F., at 30 minutes, 97.5 minutes, 127.5 minutes and 172.5 minutes. At 217.5 minutes the ambient temperature control was adjusted to 190° F. at 240 minutes. The cooked and smoked fish obtained had a soft golden color, is moist, tender and highly marketable. The droppers are negligible. The ambient oven temperatures, wet bulb temperature in the oven and the temperature at the center of the fish during the cooking period are given in Table 5, below.

TABLE 5

| Cooking Time (Minutes) | Ambient Temp. (°F.) | Wet Bulb Temp. (°F.) | Fish Internal Temp. (°F.) |
| --- | --- | --- | --- |
| 0 | 88 | 62 | 72 |
| 7.5 | 100 | 63 | 78 |
| 15 | 98 | 64 | 81 |
| 22.5 | 100 | 64 | 86 |
| 30 | 104 | 64 | 90 |
| 37.5 | 108 | 64 | 94 |
| 45 | 112 | 64 | 97 |
| 52.5 | 118 | 80 | 100 |
| 60 | 118 | 88 | 101 |
| 67.5 | 120 | 104 | 102 |
| 75 | 112 | 80 | 104 |
| 82.5 | 114 | 78 | 106 |
| 90 | 130 | 78 | 114 |
| 97.5 | 132 | 78 | 118 |
| 105 | 140 | 84–108 | 120 |
| 112.5 | 138 | 84–108 | 122 |
| 120 | 140 | 84–108 | 122 |
| 127.5 | 136 | 84–108 | 126 |
| 135 | 150 | 84–108 | 134 |
| 142.5 | 160 | 84–108 | 138 |
| 150 | 160 | 90–120 | 140 |
| 157.5 | 160 | 90–120 | 143 |
| 165 | 150 | 90–120 | 146 |
| 172.5 | 170 | 90–120 | 148 |
| 180 | 180 | 90–120 | 152 |
| 187.5 | 178 | 90–120 | 157 |
| 195 | 178 | 90–120 | 160 |
| 202.5 | 178 | 90–120 | 162 |
| 210 | 178 | 90–120 | 164 |
| 217.5 | 185 | 130–148 | 165 |
| 225 | 190 | 130–148 | 169 |
| 232.5 | 178 | 130–148 | 174 |
| 240 | 190–200 | 130–148 | 175 |
| 247.5 | 190–200 | 130–148 | 178 |
| 255 | 190–200 | 130–148 | 179 |
| 262.5 | 190–200 | 130–148 | 180 |
| 270 | 190–200 | 130–148 | 182 |
| 277.5 | 190–200 | 130–148 | 184 |
| 285 | 190–200 | 130–148 | 183 |
| 300 | 190–200 | 130–148 | 184 |
| 307.5 | 190–200 | 130–148 | 184 |
| 315 | 190–200 | 130–148 | 184 |
| 322.5 | 190–200 | 130–148 | 184 |
| 330 | 190–200 | 130–148 | 184 |
| 337.5 | 190–200 | 130–148 | 184 |

What is claimed is:

1. A method of hot smoking fish, which comprises:
   a. providing said fish in a condition ready for hot smoking;
   b. drying the fish skin surface under non-cooking conditions;
   c. cooking the fish by subjecting said fish to ambient temperatures and humidities according to the following sequence:
      1. at a temperature of up to about 110° F. until the temperature at the center of the fish is within the range of from about 85° F. to 105° F.;
      2. at a temperature of from about 110° F. to about 130° F. until the temperature at the center of the fish is within the range of from about 100° F. to 125° F.;
      3. at a temperature of from about 130° F. to about 150° F. at a relative humidity of from about 14 to 50 percent until the temperature at the center of the fish body reaches a temperature of from about 125° F. to about 145° F.;
      4. at a temperature of from about 150° F. to 170° F. and at a relative humidity of from about 23 percent to 50 percent until the temperature at the center of the fish body reaches a temperature of from about 145° F. to about 165° F.;
      5. at a temperature of from about 170° F. to 200° F. and at a relative humidity of from about 7 percent to 40 percent until the temperature at the center of the fish body reaches a temperature of from about 160° F. to about 180° F.;
   d. smoking the fish at a time within the cooking period until the desired color is achieved; and
   e. cooling the cooked fish to room temperatures.

2. The method of claim 1 wherein said fish are fresh water fish.

3. The method of claim 2 wherein said fish are selected from the group consisting of chubs and Whitefish.

4. The method of claim 1 wherein a minimum temperature of 160° F. is maintained at the center of the fish body for at least 30 minutes.

5. The method of claim 1 wherein a minimum temperature of 180° F. is maintained at the center of the fish body for at least 30 minutes.

6. The method of claim 1 wherein in the incremental temperature increase of sequence step (5), the temperature is adjusted upwards at increments of about 10° F., each incremental raising occurring as the temperature of the fish body at its center approaches within about 5° F. of the ambient temperature.

7. The method of claim 6 wherein the relative humidity in sequence step (5) is within the range of from 7 to 35 percent.

8. The method of claim 1 wherein the ambient relative humidity during steps (C) 1 and (C) 2 is maintained within the range of from 7 to about 50 percent.

9. The method of claim 1 wherein the sequential cooking step 5 is carried out by subjecting the fish to ambient temperatures and humidities according to the following sequence:
   (i) at a temperature of circa 180° F. while maintaining a relative humidity of from 11 to 14 percent;
   (ii) then at a temperature of circa 190° F. while maintaining a relative humidity of from 9 to 12 percent; and
   (iii) then at a temperature of circa 200° F. while maintaining a relative humidity of from 7 to 9 percent.

10. The method of claim 1 wherein cooking is terminated after the temperature at the center of the fish body reaches at least 160° F. for a period of about 30 minutes.

11. The method of claim 10 wherein the temperature at the center of the fish body is at least 180° F. for about 30 minutes.

* * * * *